United States Patent Office 3,299,652
Patented Jan. 24, 1967

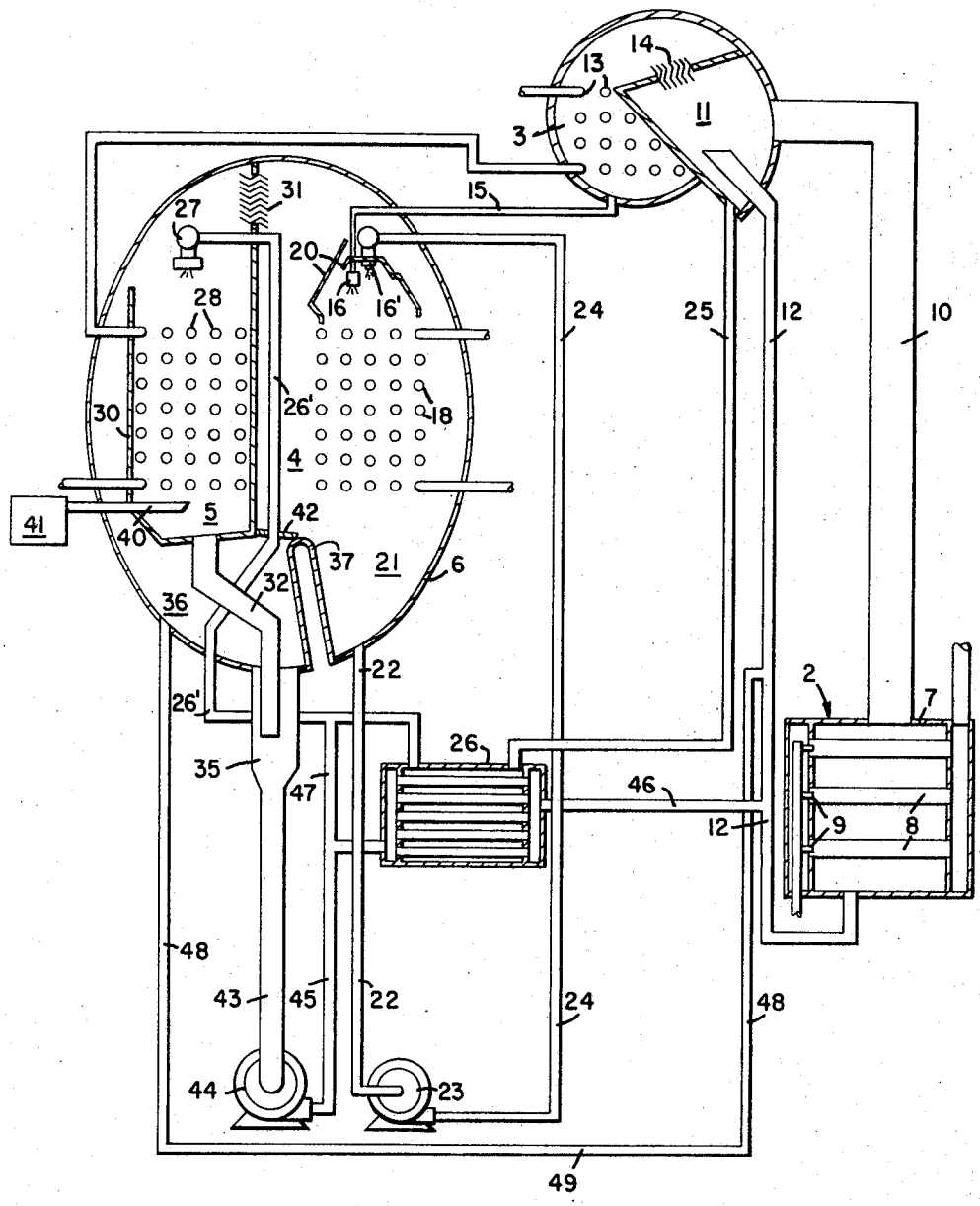

3,299,652
ABSORPTION REFRIGERATION SYSTEMS
Keith V. Eisberg, Camillus, and Joseph R. Bourne, Dewitt, N.Y., assignors to Carrier Corporation, Syracuse, N.Y., a corporation of Delaware
Filed Apr. 14, 1965, Ser. No. 448,132
10 Claims. (Cl. 62—101)

This invention relates to absorption refrigeration systems and, more particularly, to an absorption refrigeration system designed to maintain a constant pressure head on its generator to eliminate instability.

The chief object of the present invention is to provide an absorption refrigeration system including a generator utilizing a vapor lift tube and a pump for solution circulation in which instability of the generator at start-up is greatly reduced.

An object of the present invention is to provide an absorption refrigeration system designed to prevent malfunction such as crystallization or solidification of solution in a solution heat exchanger.

A further object of the invention is to provide an absorption refrigeration system so designed as to assure an adequate solution supply in a direct fired generator when the system is placed in operation.

A further object is to provide a method of operation of an absorption refrigeration system which prevents conditions of instability at start-up. Other objects of the invention will be readily perceived from the following description.

This invention relates to a method of operation of an absorption refrigeration system. The absorption refrigeration system includes a generator, a condenser, an evaporator, an absorber, a pump to forward weak solution from the absorber to the generator, and means to supply strong solution from the generator to the absorber. At start-up, a heat exchange medium is supplied to the generator to boil solution therein; weak solution is passed in a path about the absorber while solution in the generator is subjected to pressure of solution in said path, and, upon substantial boiling of said solution in the generator, substantial flow of weak solution in said path is discontinued and the weak solution is supplied to the generator.

This invention further relates to an absorption refrigeration system comprising, in combination, a generator, a separator, a condsener, an evaporator, an absorber. The system includes means for supplying a heating medium to the generator, a pump for forwarding weak solution from the absorber to the generator, and a vapor lift tube connecting the generator and the separator. The system further includes means connecting the separator and the absorber, means connecting the separator and the generator, a line connecting the pump with said separator-generator connecting means, and a second line connecting the absorber with said separator-generator connecting means. Upon start-up of the system, weak solution is pumped in a path about the absorber while, upon substantial boiling of solution in the generator, the weak solution is supplied to the generator.

The attached drawing is a diagrammatic view of an absorption refrigeration system embodying the present invention.

The absorption refrigeration system of the present invention preferably employs water as the refrigerant and a solution of lithium bromide as the absorbent solution although other refrigerants and absorbents may be employed. As used herein, the term "strong solution" refers to a concentrated solution of lithium bromide which is strong in absorbing power; the term "weak solution" refers to a dilute solution of lithium bromide which is weak in absorbing power.

Referring to the attached drawing, there is shown an absorption refrigeration system including a generator section 2, a condenser section 3, an evaporator section 4 and an absorber section 5 interconnected to provide refrigeration. The evaporator and the absorber sections may be placed within a horizontally extending, substantially cylindrical shell 6.

Generator section 2 comprises a shell 7 having a plurality of fire tubes 8 passing therethrough. Gas jets 9 supply an ignited mixture of gas and air into fire tubes 8 to heat weak solution which is supplied to the generator. A vapor lift tube 10 extends from the top of shell 7. Weak solution is heated in generator section 2 to boil off refrigerant vapor thereby concentrating the weak solution. A mixture of concentrated absorbent solution and refrigerant bubbles rises upwardly through vapor lift tube 10 and passes into separator chamber 11. Equalizer line 12, connecting the bottom of generator 2 and separator 11, serves as an overflow under some conditions and assists in stabilizing the generator boiling, as hereinafter described.

Condenser section 3 may be contained in the same shell as separator chamber 11 and comprises a plurality of heat exchange tubes 13 through which any suitable cooling medium such as water is passed. Refrigerant vapor separates from the mixture of absorbent solution passed to separator chamber 11 and passes to condenser section 3 through eliminators 14. The refrigerant vapor is condensed to liquid refrigerant in condenser section 3 by the cooling medium passing through tubes 13. Liquid refrigerant passes from condenser section 3 through condensate line 15 to spray nozzles 16 in evaporator section 4.

Evaporator section 4 comprises a plurality of longitudinally extending heat exchange tubes 18 disposed in a tube bundle located in a region of shell 6. Water or other heat exchange fluid to be cooled is passed through tubes 18 in heat exchange relation with refrigerant supplied over exterior surfaces of the tubes. Heat is absorbed from the water to be cooled by the refrigerant thereby cooling the water in tubes 18 and vaporizing refrigerant on exterior surfaces of the tubes. The vaporized refrigerant passes from evaporator section 4 into absorber section 5 carrying with it the heat absorbed from the water passed through tubes 18. The chilled water may be circulated to a place of use as desired. Baffles 20 are provided to direct refrigerant vapor from the spray nozzles 16 toward the tube bundle in the evaporator section.

Shell 6 includes an evaporator sump 21 to receive unevaporated liquid refgrigerant which drips off the lower rows of tubes 18. A refrigerant recirculation line 22 receives refrigerant from sump 21, the refrigerant being pumped by pump 23 through line 24 to nozzles 16' where it is again discharged over the top of the tube bundle in the evaporator section.

Strong solution is passed from the lower portion of separator chamber 11 through strong solution line 25, through heat exchanger 26 in which it is placed in heat exchange relation with weak solution passing to the generator, the strong solution flowing from heat exchanger 26 through line 26' to spray nozzles 27 in the absorber, and is distributed by spray nozzles 27 over longitudinally extending tubes 28 to wet the absorber tubes.

Cooling water or other suitable cooling medium is passed through tubes 28 to cool the absorbent solution sprayed on their exterior surfaces. An absorber pan 30 is arranged around the sides and bottom of the tube bundle in the absorber section. Eliminators 31 may be provided if desired in the vapor path between the absorber and the evaporator section.

An absorber discharge conduit 32 collects and discharges the solution into outlet 35 of solution storage sump 36 which is formed in the lower portion of the absorber section of shell 6.

Baffle 37 extends longitudinally of cylindrical shell 6 and separates sumps 21, 36.

A purge line 40 may be provided adjacent the lower portion of the tube bundle in absorber section 5 and is connected to a suitable purge unit 41. If desired, a baffle 42 may be provided between absorber pan 30 and evaporator section 4 to prevent unwanted refrigerant draining into the absorber section.

Absorbent solution is withdrawn from the absorber section through weak solution line 43 connected to outlet 35 of the absorber and is forwarded by pump 44 through line 45, heat exchanger 26 and line 46 to equalizer line 12 where it is forwarded to the generator section for reconcentration. If desired, a portion of the weak solution discharged by pump 44 may be passed through weak solution recirculating line 47 to mix with concentrated absorbent solution in line 26' and recirculate through spray nozzles 27.

Preferably, a line 48 is provided between equalizer line 12 and the lower portion of absorber 5. A loop 49 is provided in line 48 to maintain pressure difference under normal operating conditions. Line 48 maintains the proper solution level in generator section 2 when the machine is placed in operation, as hereinafter explained.

Considering operation of the system at start-up, fire tubes 8 in generator 2 are covered with weak solution. Gas jets 9 supply an ignited mixture of gas and air into fire tubes 8 to heat the weak solution. Pump 44 pumps weak solution from the absorber through heat exchanger 26 to equalizer line 12. This general arrangement would render operation at start-up highly unstable for lift tubes are inherently unstable and the generator is forced to find a pumping rate. Under some circumstances, the vapor lift tube might fill with solution so that solution in the generator becomes highly superheated and its conversion to vapor may carry solution through the separator to the condenser to contaminate the refrigerant circuit.

In accordance with the present invention, line 48 is provided, connected to equalizer line 12 at a desired point between the separator 11 and the juncture of line 46 with line 12. At start-up, pump 44 passes weak solution from the absorber through line 45, heat exchanger 26 and line 46 to equalizer line 12. Solution in line 12 backs up therein so that at start-up the head on the generator is never greater than solution level in line 12. Solution in the generator covering the fire tubes is subject, of course, to pressure of solution pumped by pump 44. Solution in line 12 backs up and flows through line 48 to the absorber sump 36. Thus, weak solution is recirculated about the absorber at start-up until substantial boiling of solution in the generator begins. Upon substantial boiling of solution in the generator, the vapor lift tube begins to function, permitting solution to flow from line 12 into the generator and reducing the level of solution in line 12 to an operating height dependent on the head required by the vapor lift tube and the pumping rate; pump 44 thus forwards weak solution to the generator, discontinuing the passage of solution through line 48 to the absorber and providing normal operation of the refrigeration system.

So operating the system assures stable operation of the generator during start-up, assures a flooded pump suction and reduces solution charge.

In some cases, where abnormal operation may exist due to crystallization or solidification of solution in the heat exchanger, the present invention serves automatically to desolidify or dissolve the crystallized solution by permitting hot strong solution to pass through line 48 to the pump suction, the hot solution being pumped through the tube side of the heat exchanger automatically desolidifying the shell side.

While we have pointed out that loop 49 must be deep enough to maintain pressure difference under normal operation conditions, a valve (not shown) may be used in the line, if desired.

If, during electrical shutdown for any reason, pump 44 discontinues operation, solution may pile up in the absorber and flow through line 48 and line 12 to generator 2 thus assuring, when the system is again placed in operation, adequate solution will be present in the generator to prevent burning out of the fire tubes.

Under some conditions, such as low condensing temperature, pressure may not be adequate to maintain desired flow of strong solution to the absorber through line 25. Under these conditions, solution will collect in separator 11, a minor portion of the collected solution flowing through line 48 to the absorber thus maintaining stable operation.

The present invention provides an absorption refrigeration system which eliminates instability of operation of the generator during start-up without any substantial increase in cost of the system. The present invention similarly provides for simple and rapid desolidification of the heat exchanger of the system if malfunction of the system occurs and salt crystallizes or precipitates in the heat exchanger. In addition, the present invention assures that the fire tubes in the generator are covered when operation of the system is discontinued, thus preventing burnouts during start-up of the system.

While we have described a preferred embodiment of the invention, it will be appreciated the invention is not limited thereto since it may be otherwise embodied within the scope of the following claims.

We claim:

1. In a method of operation of an absorption refrigeration system including a generator, a condenser, an evaporator, an absorber, a pump to forward weak solution from the absorber to the generator and means to supply strong solution from the generator to the absorber, the steps which consist in, at start-up, supplying a heat exchange medium to the generator to boil solution therein, passing weak solution in a path about the absorber while subjecting solution in the generator to pressure of solution in said path, and, upon substantial boiling of solution in the generator, discontinuing substantial flow of weak solution in said path and supplying the weak solution to the generator.

2. In a method of operation of an absorption refrigeration system including a generator, a condenser, an evaporator, an absorber, a pump to forward weak solution from the absorber to the generator and means to supply strong solution from the generator to the absorber, the steps which consist in, at start-up, supplying a heat exchange medium to the generator to boil solution therein, passing weak solution in a first path about the absorber while subjecting solution in the generator to pressure of solution in said path, upon substantial boiling of solution in the generator, discontinuing substantial flow of weak solution in said path and supplying the weak solution to the generator, forwarding by vapor lift action a mixture of strong solution and vapor from the generator to a separator, separating the vapor from the strong solution, condensing the vapor, forwarding the condensate to the evaporator and supplying strong solution from the separator to the absorber in a separate second path.

3. The method of operation of an absorption refrigeration system according to claim 2 which includes the step of supplying at least a portion of the strong solution from the separator to the absorber through at least a portion of the first path when supply of strong solution from the separator to the absorber through the second path is retarded.

4. A method of operation of an absorption refrigeration system according to claim 3 which includes the step of passing hot strong solution returned to the absorber through the first path through a heat exchanger to dissolve solution crystallized therein.

5. A method of operation of an absorption refrigeration system according to claim 2 which includes the step of passing solution from the absorber through at least a portion of the first path to the generator when operation of the pump is discontinued to assure sufficient solution in the generator upon start-up.

6. In an absorption refrigeration system, the combination of a generator, a separator, a condenser, an evaporator, an absorber, means for supplying a heating medium to the generator, a pump for forwarding weak solution from the absorber to the generator, a vapor lift tube connecting the generator and the separator, means connecting the separator and the absorber, means connecting the separator and the generator, a line connecting the pump with said separator-generator connecting means, and a second line connecting the absorber with said separator-generator connecting means so that, upon start-up of the system, weak solution is pumped in a path about the absorber while, upon substantial boiling of solution in the generator, the weak solution is supplied to the generator.

7. In an absorption refrigeration system, the combination of a generator, a separator, a condenser, an evaporator, an absorber, means for supplying a heating medium to the generator, a pump for forwarding weak solution from the absorber to the generator, a vapor lift tube connecting the generator and the separator, a line connecting the separator and the absorber to return strong solution to the absorber, an equalizer line connecting the separator and the generator, a third line connecting the pump with said equalizer line, a fourth line connecting the absorber with said equalizer line so that, upon start-up of the system, the pump forwards solution from the absorber through the third line into the equalizer line, through the equalizer line to the fourth line and through the fourth line to the absorber while, upon substantial boiling of solution in the generator, the pump forwards weak solution from the absorber through the third line and equalizer line to the generator.

8. An absorption refrigeration system according to claim 7 in which a heat exchanger for strong solution and weak solution is provided, said heat exchanger being placed in the first line and in the third line, retarded flow of strong solution through the heat exchanger permitting strong solution to pass through said fourth line to the absorber.

9. An absorption refrigeration system according to claim 8 so constructed and arranged that, upon shutdown of the pump, solution flows from the absorber through the fourth line and equalizer line to the generator thereby assuring adequate solution in the generator during start-up.

10. An absorption refrigeration system according to claim 8 so constructed and arranged that upon low condensing temperatures excess solution collected in the separator passes through the equalizer line and the fourth line to the absorber.

References Cited by the Examiner
UNITED STATES PATENTS

| | | | |
|---|---|---|---|
| 2,479,062 | 8/1949 | Edel | 62—489 |
| 2,518,180 | 8/1950 | Reid | 62—494 |
| 2,550,429 | 4/1951 | Reid | 62—494 X |
| 3,014,349 | 12/1961 | Leonard | 62—85 |
| 3,187,515 | 6/1965 | Swearingen | 62—85 |
| 3,206,947 | 9/1965 | Bourne et al. | 62—489 |

LLOYD L. KING, *Primary Examiner.*